(12) United States Patent
Dotson

(10) Patent No.: US 6,383,504 B1
(45) Date of Patent: May 7, 2002

(54) PREPACKAGED CONTACT LENS WEARER HAND NEUTRALIZING TOWELETTE AND CONTACT REWETTING AGENT

(76) Inventor: R. Scott Dotson, 850 S. Tamiami Trail, #607, Sarasota, FL (US) 34236

( * ) Notice: Subject to any disclaimer, the term of this patent is extended or adjusted under 35 U.S.C. 154(b) by 0 days.

(21) Appl. No.: 09/708,860

(22) Filed: Nov. 8, 2000

(51) Int. Cl.[7] .......................... A01N 25/34; A61K 9/00; A61K 6/00
(52) U.S. Cl. .................. 424/402; 424/400; 424/401; 424/404
(58) Field of Search ............................... 424/402, 401, 424/403, 404, 405; 206/210

(56) References Cited

U.S. PATENT DOCUMENTS

| | | | |
|---|---|---|---|
| 3,653,839 A | * 4/1972 | Luks et al. | 23/230 R |
| 4,220,244 A | 9/1980 | Elmore | 206/210 |
| 4,332,319 A | 6/1982 | Hurwood | 206/210 |
| 4,437,567 A | 3/1984 | Jeng | 206/210 |
| 4,533,399 A | 8/1985 | Mencke | 134/6 |
| 4,622,258 A | 11/1986 | Mencke | 428/171 |
| 4,627,936 A | 12/1986 | Gould et al. | 252/558 |
| 4,678,698 A | 7/1987 | Mencke | 428/171 |
| 4,779,300 A | 10/1988 | Pompe | 15/104.93 |
| 4,790,950 A | 12/1988 | Hutchings | 252/102 |
| 4,796,751 A | 1/1989 | Madkour | 206/203 |
| 4,881,278 A | 11/1989 | Farah | 4/243 |
| 4,990,334 A | 2/1991 | Longino et al. | 424/401 |
| 4,998,984 A | 3/1991 | McClendon | 206/205 |
| 5,054,610 A | 10/1991 | Ajello | 206/5.1 |
| 5,088,146 A | 2/1992 | Smith et al. | 15/104.94 |
| 5,598,601 A | 2/1997 | Eaton et al. | 15/214 |
| 5,598,919 A | 2/1997 | Taylor | 206/5.1 |
| 5,616,337 A | 4/1997 | Kasianovitz et al. | 424/414 |
| 5,753,246 A | 5/1998 | Peters | 424/404 |
| D396,803 S | 8/1998 | Belmonte | D9/305 |
| 5,984,089 A | * 11/1999 | Dotson | 206/210 |
| 6,082,534 A | * 7/2000 | Dotson | 206/210 |

* cited by examiner

Primary Examiner—Thurman K. Page
Assistant Examiner—Rachel M. Bennett

(57) ABSTRACT

A prepackaged disposable towelette and saline solution each separably held within a disposable sealed package. The towelette is presaturated with a neutralizing solution so that, as finger residue is rubbed off and absorbed into the fabric of the towelette, the finger skin pH is also substantially neutralized which minimizes eye irritation each time a contact lens user reinstalls each contact lens. The saline solution, held within a separate hermetically sealed ampule, rewets each contact lens before contact lens installation to further reduce eye irritation.

6 Claims, 1 Drawing Sheet

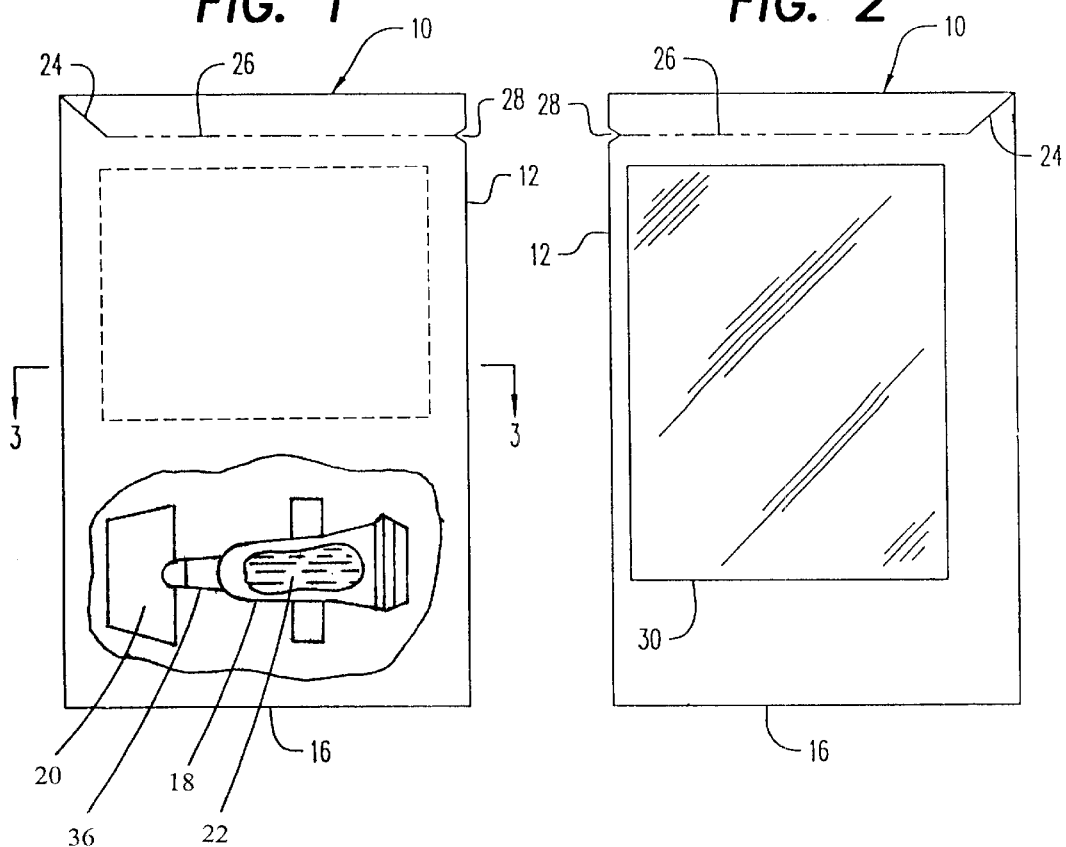

PREPACKAGED CONTACT LENS WEARER HAND NEUTRALIZING TOWELETTE AND CONTACT REWETTING AGENT

BACKGROUND OF THE INVENTION

1. Scope of Invention

This invention relates generally to premoistened and prepackaged towelettes, and more particularly for a prepackaged contact lens wearer hand cleaning and neutralizing handwipe or towelette and contact lens rewetting solution.

2. Prior Art

A great variety of prepackaged and premoistened towelettes are currently available in the marketplace and otherwise known through prior U.S. patents. Some of these prior art teachings are directed to the particular formulation of the disposable sheet material while others are directed to prepackaged towelettes or handwipes bearing unique solutions and other features for the particular intended purpose.

The following U.S. patents describe this known prior art technology as follows.

U.S. Pat. No. 4,220,244 issued to Elmore
U.S. Pat. No. 4,533,399 issued to Mencke
U.S. Pat. No. 4,622,258 issued to Mencke
U.S. Pat. No. 4,627,936 issued to Gould et al.
U.S. Pat. No. 4,678,698 issued to Mencke
U.S. Pat. No. 4,779,300 issued to Pompe
U.S. Pat. No. 4,998,984 issued to McClendon
U.S. Pat. No. 5,054,610 issued to Ajello
U.S. Pat. No. 5,088,146 issued to Smith et al.
U.S. Pat. No. 5,598,601 issued to Eaton, et al.
U.S. Pat. No. 5,598,919 issued to Taylor
U.S. Pat. No. 5,753,246 issued to Peters
U.S. Pat. No. Des 396,803 issued to Belmonte
U.S. Pat. No. 5,984,089 of Applicant
U.S. Pat. No. 6,082,534 of Applicant None of these prior art patents, however, except for my two (2) above-referenced patents, address the issue of not only cleansing the fingers of a contact lens wearer prior to reinstallation of a contact lenses, but also neutralizing the acidity/alkalinity of the finger surfaces to minimize eye irritation when the contact lens is reinstalled on the eye of the user. Lotions, soaps, make-up, dirt and other irritants, when placed inadvertently on a contact lens, will cause pain, irritation and even eye infection. Moreover, there is also a need for providing of a small quantity of e.g. saline solution, as in sealed ampule form, which is important for rewetting the contact lens prior to its installation. The present invention is particularly useful in these ways and is intended for contact lens wearers who either inadvertently dislodged or dropped their contact lens or have to remove them because of eye irritation. To further facilitate the reinstallation, one surface of the packaging is mirror reflective and of sufficient size and clarity such that the user may carefully watch the reinstallation of each contact lens.

BRIEF SUMMARY OF THE INVENTION

This invention is directed to a prepackaged disposable towelette and a rewetting solution separably held within a disposable sealed package. The towelette is presaturated with a neutralizing solution so that, as finger residue is rubbed off and absorbed into the fabric of the towelette, the finger skin pH is also substantially neutralized which minimizes eye irritation each time a contact lens user reinstalls a contact lens. The rewetting solution, held within a separate sealed ampule, rewets the contact lens before contact lens installation to further reduce eye irritation.

It is therefore an object of this invention to provide a prepackaged disposable cleaning and neutralizing towelette and a separately held quantity of rewetting solution such as saline solution for rewetting the contact lens before installation.

It is another object of this invention to provide a disposable cleaning and neutralizing towelette which is saturated with a neutralizing solution which, in combination with the soil and residue abrading action of a towelette, will cleanse and neutralize the acidity or alkalinity of the finger and hand surfaces prior to handling and reinstalling of a contact lens.

It is still another object of this invention to provide a prepackaged disposable cleaning and neutralizing towelette in combination with a quantity of saline solution held separately in a sealed ampule within the sealed package and further in combination with a mirrored reflective surface on the outside of the packaging to assist in reinstalling a contact lens.

In accordance with these and other objects which will become apparent hereinafter, the instant invention will now be described with reference to the accompanying drawings.

BRIEF DESCRIPTION OF THE DRAWINGS

FIG. 1 is a front elevation twice broken view of the invention.

FIG. 2 is a rear elevation view of the invention.

FIG. 3 is a section view in the direction of arrow 3—3 in FIG. 1.

DETAILED DESCRIPTION OF THE INVENTION

Referring now to the drawings, the invention is shown generally at numeral 10 in all views and includes a sealed generally flat, rectangular package 12 formed of two layers of non-porous panels 32 and 34 such as aluminum foil, plastic sheets and the like. The common edges or margins 16 common to both of the panels 32 and 34 of the sealed package 12 are hermetically sealed along all peripheral edges.

A disposable towelette 14 is hermetically sealed within the main cavity or compartment of the sealed package 12 as seen in FIG. 3. The size and fabric strength of the fabric material used to form each towelette 14 is sufficient to withstand vigorous rubbing and abrading of the fingers and hands of the user prior to reinstalling each contact lens.

In addition to the abrasive removal of skin residue and dirt, the towelette 14 is substantially saturated with a liquid solution which will neutralize the acidity of alkalinity of the skin surface prior to reinstallation. Applicant has found that, by neutralizing at least the finger surfaces prior to handling a cleaned and ready-to-reinstall contact lens, substantial eye irritation is avoided. Moreover, even washing hands with soap prior to handling and installing a contact lens may not remove soap residue and other irritants, including elements in the tap water itself.

A general description of the neutralizing agent is that of a cleaning and neutralizing solution comprised of sterile ingredients with similar properties to a "no tears" baby soap or shampoo. This solution may be soap-free, dye-free, pH-balanced and should contain no hand creams or other cosmetic ingredients which can cause eye irritation. It is recognized that the finger and hand skin surfaces generally become acidic rather than basic. Therefore, a hydroxide-based solution would generally be preferred.

Typically, a contact lens wearer is most likely to have need for the present invention when traveling or otherwise away from home and the permanent cleaning fluids and solutions there used. One important and sometimes overlooked aspect of reinstalling a contact lens which has inadvertently fallen from the user's eye or has been temporarily removed because of eye irritation by underlying debris, is that the contact lens quickly becomes dried. The present invention therefore also provides a quantity of saline solution 22 as a rewetting agent which is itself hermetically sealed within a separate sealed ampule 18 within the package 12 and positioned adjacent to the towelette 14 as seen in FIG. 1. Thus, the saturated towelette 14 and the ampule 18 are removable from the package 12 by tearing along a tear lines or marks of weakness 26 and 24 of chamber 18. A notch 28 facilitates the initial tearing of the package 10 along the tear line 26.

After the user has cleansed and neutralized the fingers and pertinent hand portions by rubbing the towelette 14 thereagainst, the saline solution as the preferred form of the contact lens rewetting agent 22 may be dripped or poured onto each contact lens immediately prior to reinstallation. Access to the rewetting agent 22 is had by twisting frangible plate 20 from the main body of the ampule 18 to open and expose tip 36 in a well-known manner. The rewetted surfaces of the contact lens make reinstallation much more comfortable and less irritating to the eye.

Note that, because of the general requirements of the towelette neutralizing solution above described, the contact lens should not be cleaned or rubbed with the towelette, but rather only rinsed with the supply of rewetting solution provided.

To further facilitate the reinstallation of the rewetted contact lens, a portion of one surface of the package 12 is provided with or is otherwise formed as a mirror-like reflective surface 30. The size of this reflective surface 30 is sufficient so that the user may flatten and hold the package with the mirrored surface 30 facing him or her so that the reinstallation of the contact lens may be view directly for more accurate placement and reinstallation.

While the instant invention has been shown and described herein in what are conceived to be the most practical and preferred embodiments, it is recognized that departures may be made therefrom within the scopes of the invention, which is therefore not to be limited to the details disclosed herein, but is to be afforded the full scope of the claims so as to embrace any and all equivalent apparatus and articles.

What is claimed is:

1. A prepackaged disposable cleaning and neutralizing towelette and contact lens rewetting solution comprising:
    a disposable absorbent, hand wiping sheet suitable in size and strength for single-use wiping of the fingers of a user, said sheet holding a liquid solution which facilitates cleaning of the fingers as whereby a contact lens being reinstalled onto the user's eye will not become contaminated with the residue when handled by the user during contact lens reinstallation;
    a sealed package containing said sheet;
    a quantity of saline contact lens rewetting solution contained in a separate sealed ampule in said package whereby the contact lens may be rinsed and rewetted prior to being installed onto the user's eye.

2. A prepackaged disposable cleaning and neutralizing towelette and contact lens rewetting solution as set forth in claim 1, further comprising:
    a reflective mirror surface disposed on one surface of said package of sufficient size to facilitate reinstallation of each contact lens by the user.

3. A disposable cleaning and neutralizing towelette and contact lens rewetting solution comprising:
    a prepackaged disposable absorbent, hand wiping sheet suitable in size and strength for single-use wiping of the fingers of a user, said sheet being substantially saturated with a liquid solution which will neutralize the pH level of the fingers as residue there is rubbed off and absorbed into said sheet whereby a contact lens being reinstalled onto the users eye will not become contaminated with the residue or become surface-acidified or alkalinized when handled by the user during contact lens reinstallation;
    a quantity of saline contact lens rewetting solution also prepackaged with said sheet within a sealed ampule whereby the contact lens may be rinsed and rewetted prior to being installed onto the users eye.

4. A prepackaged disposable cleaning and neutralizing towelette and contact lens rewetting solution comprising:
    a disposable absorbent, hand wiping sheet suitable in size and strength for single-use wiping of the fingers of a user, said sheet being substantially saturated with a liquid solution which will neutralize the pH level of the fingers as residue there is rubbed off and absorbed into said sheet whereby a contact lens being reinstalled onto the users eye will not become contaminated with the residue or become surface-acidified or alkalinized when handled by the user during contact lens reinstallation;
    a generally sealed package containing said sheet;
    a quantity of saline contact lens rewetting solution contained in a separate sealed ampule in said package whereby the contact lens may be rinsed and rewetted prior to being installed onto the users eye.

5. A prepackaged disposable cleaning and neutralizing towelette and contact lens rewetting solution comprising:
    a disposable absorbent, hand wiping sheet suitable in size and strength for single-use wiping of the fingers of a user, said sheet being substantially saturated with a liquid solution which will neutralizing the pH level of the fingers as residue there is rubbed off and absorbed into said sheet whereby a contact lens being reinstalled onto the user's eye will not become contaminated with the residue or become surface-acidified or alkalinized when handled by the user during contact lens reinstallation;
    a generally sealed package containing said sheet;
    a quantity of saline contact lens rewetting solution contained separately within said package whereby the contact lens may be rinsed and rewetted prior to being installed onto the user's eye;
    a reflective mirror surface disposed on one surface of said package of sufficient size to facilitate reinstallation of each contact lens by the user.

6. A prepackaged disposable cleaning and neutralizing towelette and contact lens rewetting solution consisting essentially of:
    a disposable absorbent, hand wiping sheet suitable in size and strength for single-use wiping of the fingers of a user, said sheet being substantially saturated with a liquid solution which will neutralize the pH level of the fingers as residue there is rubbed off and absorbed into said sheet whereby a contact lens being reinstalled onto the user's eye will not become contaminated with the residue or become surface-acidified or alkalinized when handled by the user during contact lens reinstallation;

a sealed package containing said sheet;

a quantity of saline contact lens rewetting solution contained in a separate sealed ampule within said package whereby the contact lens may be rinsed and rewetted prior to being installed onto the users eye;

a reflective mirror surface disposed on one surface of said package of sufficient size to facilitate reinstallation of each contact lens by the user.

* * * * *